INVENTORS
JAMES W. BRYCE
JOHN N. WHEELER
BY
J. W. Louwitz
ATTORNEY

INVENTORS
JAMES W. BRYCE
JOHN N. WHEELER
BY
J. W. Lowenitz
ATTORNEY

INVENTORS
JAMES W. BRYCE
JOHN N. WHEELER
BY
F. W. Lommtzer
ATTORNEY

INVENTORS
JAMES W. BRYCE
JOHN N. WHEELER
BY F. W. Lonnitzer
ATTORNEY

INVENTORS
JAMES W. BRYCE
JOHN N. WHEELER
BY
J. W. Lommitzer
ATTORNEY

Sept. 5, 1950 J. W. BRYCE ET AL 2,521,338

READING APPARATUS

Filed Sept. 19, 1946 6 Sheets-Sheet 6

INVENTORS
JAMES W. BRYCE
JOHN N. WHEELER
BY J. W. Lowuitzer
ATTORNEY

Patented Sept. 5, 1950

2,521,338

UNITED STATES PATENT OFFICE 2,521,338

READING APPARATUS

James W. Bryce, Glen Ridge, N. J., and John N. Wheeler, Hawthorne, N. Y., assignors to International Business Machines Corporation, New York, N. Y., a corporation of New York Application September 19, 1946, Serial No. 698,032

11 Claims. (Cl. 35—35)

This invention relates to apparatus for translating and storing into one record medium, information which has been recorded previously in another record medium, whereby certain advantages are accrued relative to sensing such information; and it has for a broad object to provide apparatus of this type of simplified and improved construction and arrangement of parts.

In particular, this invention relates to a mechanism whereby intelligence previously recorded in a record strip or tape is translated and stored in another record medium which presents such information in the form of raised Braille characters at a rate compatible with the skill and under the control of the operator who is sensing the information. A device of this type is particularly suited for use by those who are blind.

Normally the dissemination of information to the blind has been by means of acoustical devices or by Braille characters embossed into stiff paper sheets bound together into book form. Either of these or similar methods requires a slow and costly process; furthermore, the products of these methods are both bulky and fragile. The invention set forth hereinafter provides for a simple and durable means by which information can be taken from such well known sources as punched tapes, as described in U. S. Patent No. 2,378,371, and translated onto a suitable medium by the way of a simple portable machine to be readily understandable to those who are skilled in reading Braille characters.

Utilization of the invention described herein for providing intelligence to the blind results in the advantages of reduced costs and reduced bulk in publications for the blind. An added advantage is in the simplicity by which information is presented in the form of Braille characters to the reader. The Braille characters are formed continuously, in accordance with translations from the record strip or tape, into a medium in the form of an endless belt which passes at a speed controlled by the reader continuously under the reader's fingers, the characters formed by groups of protruding pins being erased automatically after they are sensed to be replaced by other new characters. Consequently, there are no pages to be turned, no reversal of the line or column scanning as required in some Braille books, and at any time the reader can decrease or increase the rate at which the information is being presented to him with a minimum of difficulty.

It is, accordingly, an object of this invention to provide a device for reading information from a previously recorded record strip and translating such information into a record medium having means to form readable Braille characters.

It is a further object of this invention to provide a device for reading information from a previously recorded record strip and translating such information into Braille characters, which are set into a record medium by mechanism which is continuously under the control of the reader of the Braille characters.

Still a further object of this invention is to provide a record storing medium into which information, which has been sensed and translated into Braille characters, may be stored to be sensed and then erased.

Another object of this invention is to provide an improved storage medium into which intelligence may be stored for an indefinite period of time and then erased to have new information stored therein.

Other objects of the invention will be pointed out in the following description and claims and illustrated in the accompanying drawings, which disclose, by way of example, the principle of the invention and the best mode, which has been contemplated, of applying that principle.

Figure 1:
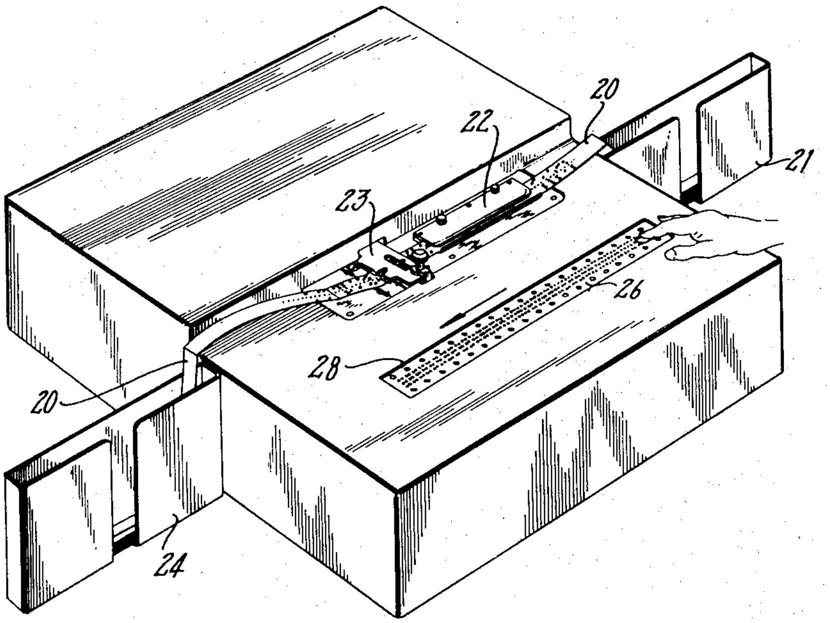
Fig. 1 is an isometric view of a device embodying the features of the invention, and includes a suggested location for placing the hand of an operator in order to read Braille characters most readily as they are presented.
Figure 11:
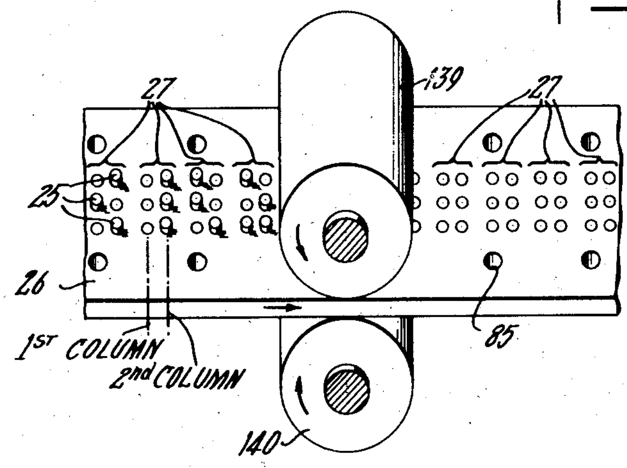
Fig. 11 illustrates a pin belt in which some pins have been set for sensing and others restored to their neutral positions.

In Fig. 1 is shown a preferred embodiment of the invention wherein a previously prepared record tape 20 is fed from a hopper 21 through a guide 22 to a sensing station 23 where information contained in the record tape 20 is sensed and analyzed in a manner similar to that shown in U. S. Patent No. 2,378,371. Thereafter, the information is passed on to the remaining mechanism of the subject invention, as hereinafter explained, and the tape 20 is fed into a receiving hopper 24. The sensed information is translated by the previously mentioned mechanisms and caused to actuate pins 25 to protrude from a pin belt 26, as shown in Fig. 11. The pins 25 are arranged in the pin belt 26 (see Fig. 11) in character groups 27 of six pins each to correspond to standard Braille character groups. The pin belt 26 is caused to move in the direction of the arrow shown in Fig. 1 so that the fingers of the hand of a person skilled in reading Braille characters may sense the positions of the protruding pins 25 as they are presented and thereby receive the information previously set up in the prepared record tape 20. The record tape 20 and the pin belt 26 are synchronized while any character group is being set into the pin belt 26; however, after a character group of set pins 25 in the pin belt 26 progresses beyond the reading area 28 the pins 25 are reset to their neutral positions so that other new settings can be made representing other new information being received from the record tape 20.

The rate of progress of both the record tape 20 and the pin belt 26 is controlled by the speed of a driving motor 29 (see Figs. 2 and 3) which is controlled by the switch 30 and the rheostat 31 (See Fig. 3), both of which controls are operated by the person who is reading the Braille character groups. These controls may be combined in a conventional manner to be operated by a foot pedal.

Figure 3:
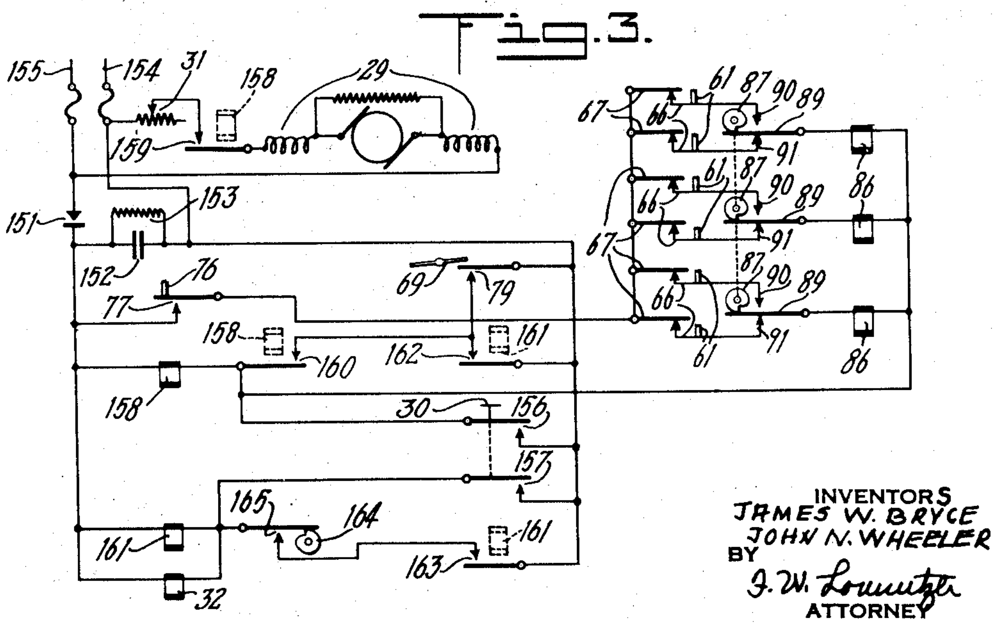
Fig. 3 is an electrical circuit diagram illustrating the necessary electrical controls and circuit wiring.
Figure 2:
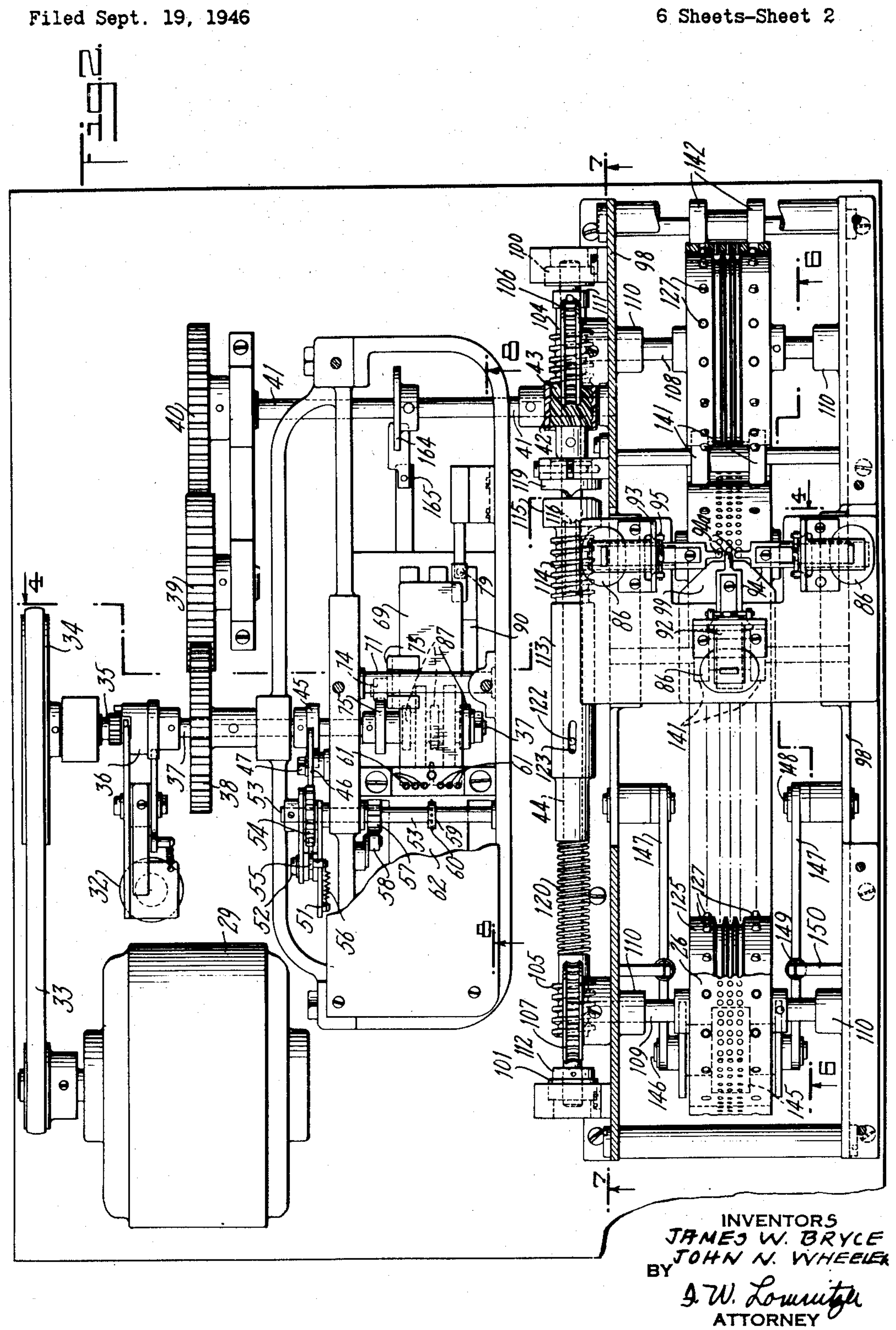
Fig. 2 is a plan view of the interior of the mechanism of Fig. 1 (cover removed).

With reference to Fig. 2 and Fig. 3, when the previously mentioned switch 30 is closed the motor 29 and the clutch magnet 32 are energized to operate. A detailed description of the electrical circuits will be made later herein.

In Fig. 2 are shown the principal operating elements of the invention. The motor 29 through a belt 33 and a pulley 34 causes a shaft 35 to rotate in a predetermined direction. The previously mentioned clutch magnet 32 controls a clutch mechanism 36 (similar to that disclosed in U. S. Patent No. 2,378,371) which couples shaft 35 to another shaft 37. Shaft 37 is the main drive shaft for the mechanism which receives the prepared record tape, and, in addition, carries cams for operating electrical circuits which are described later herein. A drive gear 38 which meshes with an idler gear 39 to drive another gear 40 is attached to shaft 37. The gear 40 is fastened to a shaft 41 which is the main drive shaft for the mechanism which operates the pin belt 26. The gear ratios are so selected that shaft 41 will make one complete revolution for each complete revolution of shaft 37. A worm gear 42 is attached to the end of the shaft 41 to mesh with a worm gear 43 attached to a shaft 44; the gear ratio of these worm gears is one-to-one.

One revolution of shaft 37 represents one machine cycle during which a length of the record tape 20 progresses sufficiently to permit the succeeding group of punched designations to be sensed, and the pin actuating mechanism actuates pins in the pin belt 26 corresponding to the sensed designations in the record tape. Cycles of operation will be repeated as long as the switch 30 remains closed.

Figure 4:
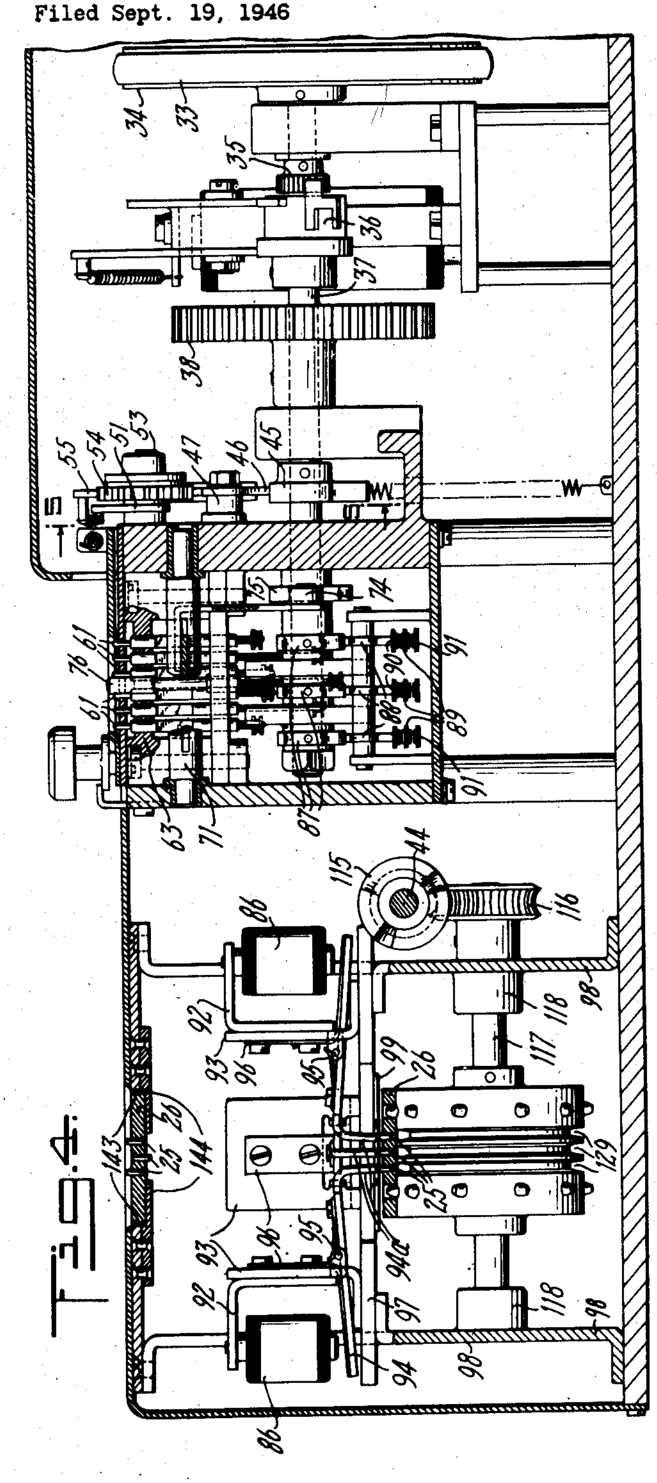
Fig. 4 is a sectional view taken substantially along the line 4—4 of Fig. 2 and showing the pin set-up mechanism and the tape analyzing mechanism.
Figure 5:
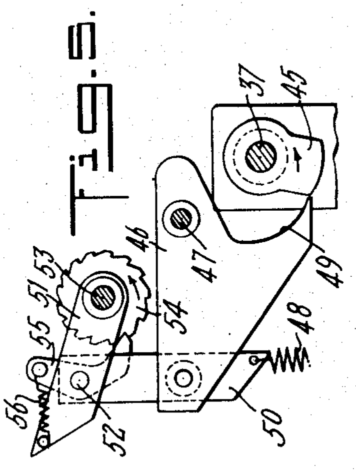
Fig. 5 is a sectional view taken substantially along the line 5—5 of Fig. 4 illustrating the tape advancing mechanism.

During the first part of each cycle, the record tape 20 is advanced to bring a new group designation into sensing position. With reference to Figs. 2, 4, and 5, the advancing mechanism consists of a cam 45 mounted on the shaft 37 and cooperating with a rocking lever 46 pivoted on a stud 47. In Fig. 5 the cam 45 and the lever 46 are shown in the starting position. When cam 45 starts to rotate, as indicated by the arrow, the lever 46 will rotate in the same direction due to the action of the spring 48 urging the cam follower 49 to follow the cam 45. Near the end of the cycle the action of the cam 45 on the cam follower 49 will rotate the lever 46 in the opposite direction. A link 50 pivoted on lever 46 is fastened to another link 51 by means of a stud 52. Link 51 is pivoted at one end on a shaft 53 to which is connected also a ratchet wheel 54. A pawl 55 is pivoted on the stud 52 and is secured to the other end of the link 51 by means of a spring 56. The action of the mechanism just described causes the ratchet 54 to be advanced by the pawl 55, in the direction indicated by the arrow, when the lever 46 begins to rotate due to the action of spring 48 at the beginning of each cycle while the link 50 will cause the pawl 55 to move upwards to engage the next tooth of ratchet 54 when the lever 46 is acted on by the cam 45 near the end of each cycle. A detent wheel 57 fixed to the shaft 53 and a cooperating roller 58 (see Fig. 2) prevent the ratchet 54 from reversing when the pawl 55 moves over it near the end of each cycle.

The shaft 53 is provided with a sprocket wheel 59 having radially extending pins 60 which engage perforations 84 (see Fig. 10) in the record tape 20 to advance it a predetermined distance when the shaft 53 rotates. The record tape 20, having perforations indicative of previously recorded informations, is caused to progress over a sensing station comprising six sensing pins 61, there being one sensing pin for each coded hole perforation in the record tape 20. When a group designation in the record tape 20 is advanced to the sensing station by the progress of the tape, the pins 61 will be aligned with their respective coded perforations in the record tape 20. Guide blocks 62 and 63 and their corresponding guide openings in a table 64 and a gate 65 (see Fig. 8) permit the sensing pins 61 to move upward in their respective sensing positions to engage and occupy perforations in the record tape when such perforations exist.

Each sensing pin 61 is supported by and opertively connected at its lower extremity to a movable spring blade 66 having an electrical contact normally closed against an electrical contact on a fixed spring blade 67. The spring blades 66 normally urge their respective sensing pins 61 upward and maintain their contacts closed with the associated contacts of the fixed spring blade 67.

Figure 8:
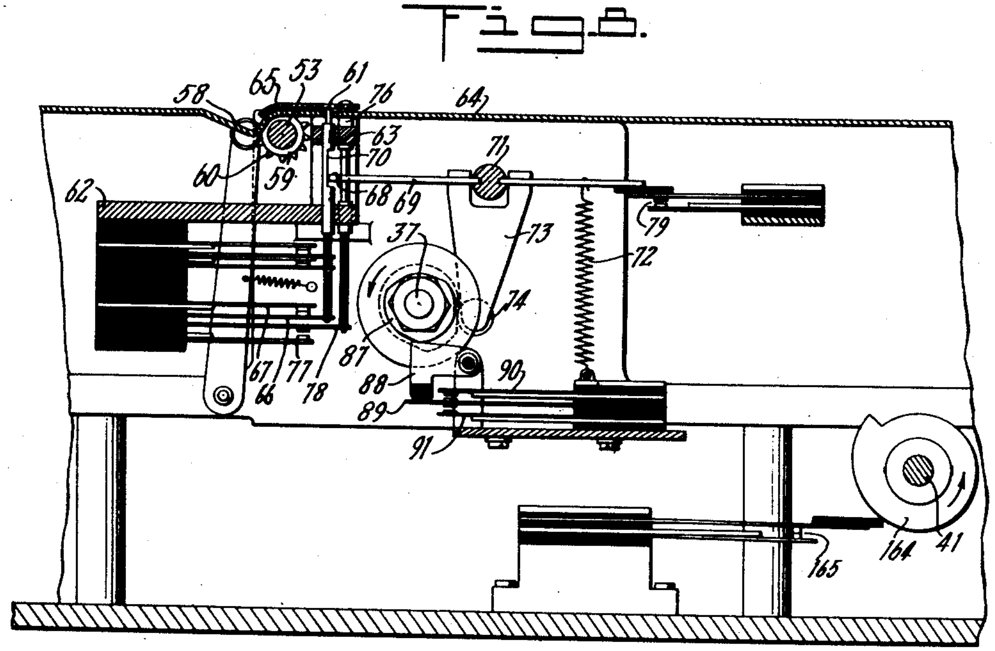
Fig. 8 is a sectional view taken along the line 8—8 of Fig. 2 illustrating the tape advancing mechanism and associated mechanisms including electrical circuit contacts.

Between sensing operations, the pins 61 are held as in Fig. 8 by the lateral edge 68 of a rocker element 69 which extends across the pins within transversely aligned notches 70 provided, respectively, in the sides of the sensing pins 61. The element 69 is pivotally supported on a stud and is constantly urged to move clockwise by a tension spring 72. A depending arm 73 carrying a roller 74 is held in contact with a cam 75 on the shaft 37 by the spring 72. When the roller 74 engages the high part of the cam 75 the element 69 is rotated counterclockwise to move the sensing pins 61 downward and to open their associated contacts such as those on spring blades 66 and 67.

Provision is made to determine when there is no record tape 20 at the sensing station by the inclusion of a seventh pin 76 and a pair of contacts 77, one of which is on a movable spring blade 78 which constantly urges the pin 76 against the record tape. The end of the pin 76 is of sufficient diameter not to emerge through any perforation in the record tape. Normally, therefore, when there is a record tape in the sensing position, the contacts 77 are closed, while when there is no record tape in the sensing position (as shown in Fig. 8) the pin 76 moves upward under the pressure of the spring blade 78 and the contacts 77 open.

A more detailed description of the record tape sensing operation is found in U. S. Patent No. 2,378,371; however, a sufficient description will be given herein to enable the present invention to be understood.

After the record tape has been moved to present a group designation in the form of perforations in the tape to the sensing station, the rocker element 69 will be moved clockwise so that the pins 61 will move upwards due to the urging of their respective contacting spring blades 66. When any of the pins 61 engages a perforation, the pin will continue to move upwards and its associated contacts on the spring blades 66 and 67 will close, thereby sensing the perforation. Any of the pins 61 which does not engage a perforation will be stopped in its upward travel by encountering the tape, thereby preventing further upward motion of the pin and maintaining its associated contacts open. Near the end of the cycle, the rocker element 69 will be rotated counterclockwise and all the pins 61 will be withdrawn from engagement or contact with the record tape to permit the latter to be advanced so that a new group designation can be sensed. A pair of contacts 79 for analyzing the position of the rocker element 69 is provided so that when the roller 74 is on the low part of the cam 75 and rocker element 69 at maximum clockwise position, the contacts 79 are closed and when the roller 74 is on the high point of the cam 75 and rocker element 69 at maximum counterclockwise position, the contacts 79 are open.

Figure 10:
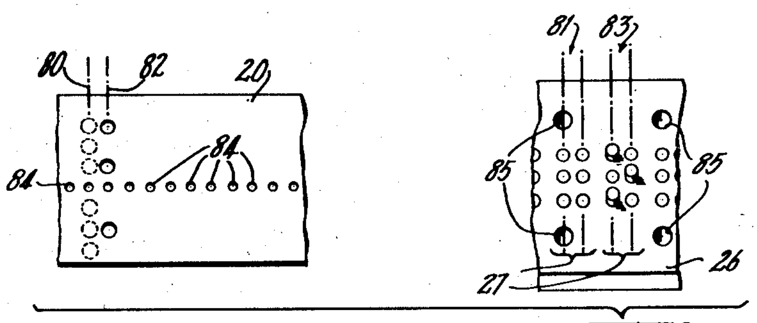
Fig. 10 is an isometric view of portions of the record tape and the pin belt showing the respective arrangements of perforations in the former and set pins in the latter according to the standard Braille code.

As has been previously mentioned, the current invention is a translating device wherein intelligence in the form of perforations in a tape is translated into pin protrusions in a flexible endless belt in order to be sensed. Fig. 10 shows the coding arrangements in the record tape 20 and in the pin belt 26. At position 80 in the record tape 20 is indicated the positions, numbered one to six, where perforations may be made to represent character group designations and at position 81 in the pin belt 26 is indicated the corresponding pin positions, numbered respectively, one to six, where pins may be set to protrude to form standard Braille character group designations. At position 82 in the record tape 20 perforations corresponding to the alphabetical character "O" have been made, while at position 83 in the pin belt 26 the corresponding pins have been set to protrude to permit one who is skilled in the reading of Braille to sense the alphabetical character "O." It is to be noted that the perforations 84 in the record tape 20 are placed for purposes of advancing the record tape. Similarly, the perforations 85 in the pin belt 26 are placed for purposes of advancing the pin belt. It is to be noted further, in order to conserve space in the record tape, that while one column of perforations is required in the record tape 20 to represent the character "O," two columns of pin protrusions are required in the pin belt 26 in order to conform to the standard Braille character group designation. In other words, interpolation is required to be performed in translating character representations from the record tape to the pin belt.

Interpolation is performed by controlling the contacts associated with the sensing pins 61 so that during one part of the operating cycle three of the sets of contacts control the energizing, respectively, of three pin setting magnets 86 (see Figs. 2, 4, and 6), while during another part of the operating cycle three other sets of contacts control the energizing, respectively, of the magnets 86. Three cams 87 are fixed to the shaft 37 to control by means of pivoted followers 88 the operation of three sets of contacts, each consisting of a movable contact blade 89, which is biased to hold a follower 88 against a cam 87, a fixed upper contact blade 90, and a fixed lower contact blade 91 (see Figs. 4 and 8).

When a cam 87 through its follower 88 moves a blade 89 to close the circuit between blades 89 and 90 during one part of the machine cycle, a magnet 86 is energized by one of a group of three sets of sensing pin contacts, while when the same cam 87 through its follower 88 moves the same blade 89 to close the circuit between blades 89 and 91 during another part of the machine cycle the same magnet 86 is energized by one of another group of three sets of sensing pin contacts. The design of the cams 87 and the associated followers and contacts is such that a movable blade 89 will contact either a fixed blade 90 or 91, or neither, during the full operating cycle.

Figure 6:
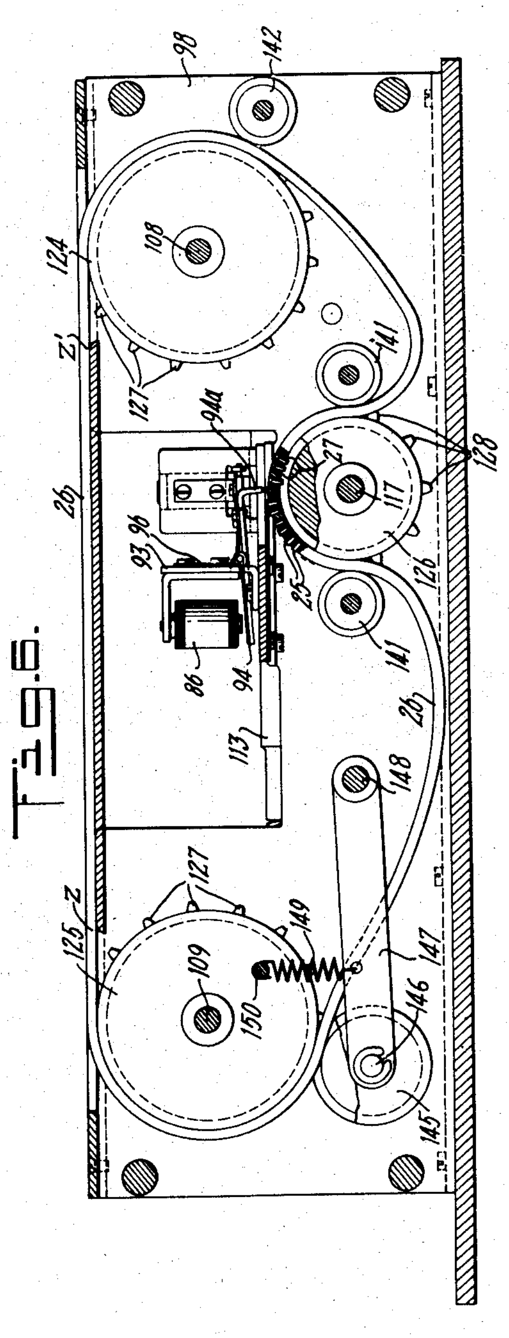
Fig. 6 is a sectional view taken along the line 6—6 of Fig. 2 showing the pin belt path, the pin resetting mechanism and the pin set-up mechanism.

The pin set-up mechanism is illustrated in Figs. 4 and 6, and consists of three pin setting magnets 86 mounted on a yoke 92 which in turn is mounted on a bracket 93 having in addition a pivotally mounted armature 94 which pivots about a pivot shaft 95. A berillium copper strip 96 is also mounted on the bracket 93 to coact with the armature 94 serving both as a residual and as a restoring spring. One end 94*a* of the armature 94 is bent over, shaped, and arranged so that when the magnet 86 is energized the armature will move to engage and to set a pin 25 to protrude a predetermined amount from the pin belt 26. The magnet supporting brackets 93 are all mounted on a common plate 97 supported by the side plates 98. On the under side of the plate is mounted a pin leveling plate 99 for the purpose of setting all pins 25 in the pin belt 26 to a uniform lever just prior to their arrival under the ends 94a of the armatures 94.

Figure 7:
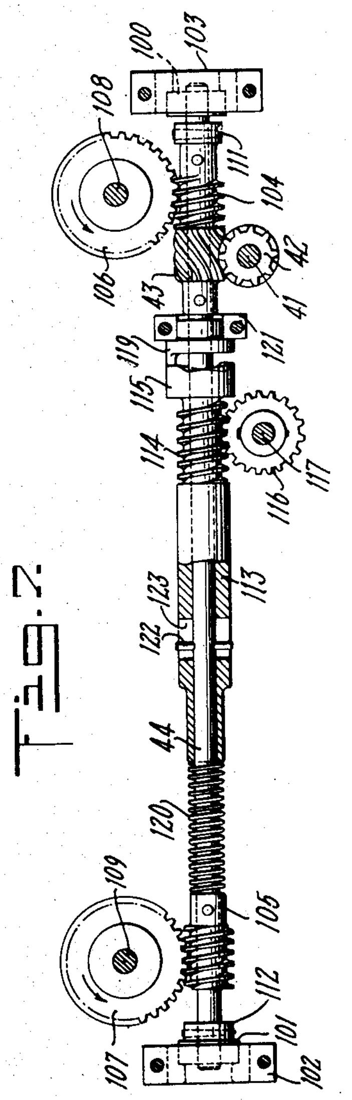
Fig. 7 is a sectional view taken along the line 7—7 of Fig. 2 and showing the drive shaft and mechanism for advancing the pin belt.

With reference to Fig. 7, the shaft 44, previously described, makes one revolution during each operating cycle, and is supported at each end by bearings 100 and 101 which are in turn mounted in the bearing plates 102 and 103 mounted on the inner side plate 98 (see Fig. 4). Rigidly mounted to the shaft 44 are two worm gears 104 and 105 meshing respectively with two worm wheels 106 and 107 which are fixed respectively to shafts 108 and 109 having bearings 110 (see Fig. 2). The worm wheels 106 and 107 cooperating respectively with the worm gears 104 and 105 are so selected to provide that for each revolution (360 degrees) of shaft 44 the shafts 108 and 109 will rotate 12 degrees. Two collars 111 and 112 are fastened to the shaft 44 and are spaced against the bearings 100 and 101 to prevent any appreciable end play of the shaft 44. Slidably mounted on the shaft 44 is also a sleeve 113 to which is fastened a worm gear 114 and a cam 115. The worm gear 114 meshes with a worm wheel 116 fixed on a shaft 117 which is provided with bearings 118 mounted to the side plates 98. The cam 115 is held against a cam follower 119 by a compression spring 120 surrounding the shaft 44 and bearing against the hub of the worm gear 105 and against the sleeve 113. Cam follower 119 is axially mounted about the shaft 44 and clamped in a block 121 which is in turn secured to the side plate 98.

The sleeve 113 is rotated by means of a pin 122 secured to shaft 44 bearing against the sleeve 113 by the way of a slot 123 cut into the sleeve. The worm wheel 116 is so selected that it rotates 18 degrees for each complete revolution of the shaft 44.

Figure 9:
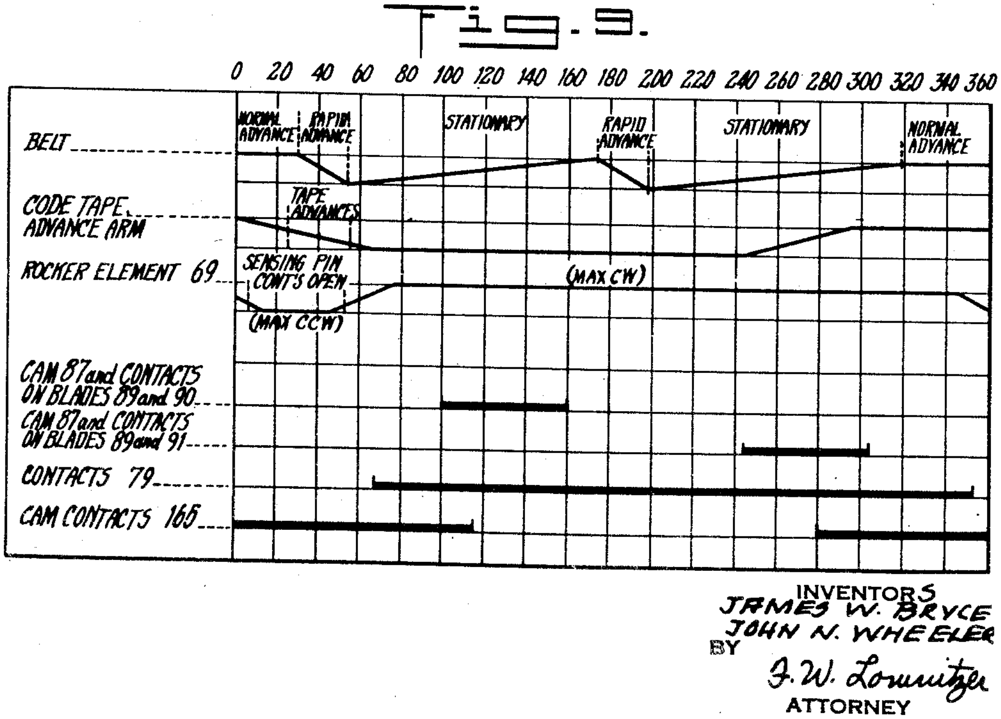
Fig. 9 is an electrical and mechanical timing chart for the device.

The cam 115 has two areas in which the rise of the cam is the same as the lead of the worm-gear 114 (see Fig. 9), i. e., from 54 degrees to 174 degrees and from 198 degrees to 318 degrees. Consequently, there are two periods (from 30 degrees to 54 degrees and from 174 degrees to 198 degrees) during which the cam has a very rapid drop and one period (from 318 degrees—through zero degrees—to 30 degrees) during which the cam has no drop nor rise. Thus, the shaft 117 has a uniform rate of rotation from 318 degrees (through zero degrees to 30 degrees). From 30 degrees to 54 degrees the shaft 117 has a very high rate of rotation, from 54 degrees to 174 degrees the shaft will be stationary. From 174 degrees to 198 degrees the shaft 117 has a very high rate of rotation, and from 198 degrees to 318 degrees the shaft 117 will be stationary again.

Attached to the shafts 108, 109, and 117 are, respectively, the sprocket wheels 124, 125, and 126, as shown in Fig. 6. The sprocket wheels 124 and 125 are of equal diameter and each has fifteen pairs of projecting teeth 127 spaced equally around its circumference. The sprocket wheel 126 is two-thirds the diameter of the sprocket wheels 124 and 125 and has ten pairs of projecting teeth 128 spaced equally around its circumference so that its peripheral linear speed will be equal to that of each of the sprocket wheels 124 and 125. Each of the three sprocket wheels has three tapered grooves 129 cut into its periphery (see Fig. 4) centrally located between the teeth 127 (in sprocket wheels 124 and 125) and the teeth 128 (in sprocket wheel 126) the grooves so spaced that each is aligned to clear a corresponding line of pins 25 of the belt 26.

The pin belt 26 is made from a continuous strip of a resilient material, such as polyvinyl butyral plastic containing predetermined pattern groups of punched holes into which are inserted metallic pins of a length substantially greater than the thickness of the strip. Due to the inherent property of materials such as polyvinyl butyral plastic when a hole is punched into a strip of such material, the resultant hole has convex sides with a minimum diameter less than the diameter of the punch. This phenomenon is due to the tendency of some materials to cause a flow of material away from an area where pressure is applied by an instrument such as a punch; however, because of the low modulus of elasticity normally found in such materials, there will be a limited flow until the punch pierces the material. When the punch is removed the material becomes partially restored and the resultant reversed flow of material produces an hour-glass shaped hole.

In this invention advantage is taken of the above phenomenon so that when a strip of such material is punched, a pin of uniform diameter, the same as the punch diameter, will be seized by the convex side walls of the punched hole when the pin is inserted. By regulating the temperature at which the punching operation is performed, the effect noted above can be regulated so that a pin inserted in a punched hole in a strip of material having such properties will be gripped with any reasonably desired pressure, consequently the pin can be moved to protrude from the strip and returned to its original position again and again thus avoiding the necessity for providing springs to hold the pin in various positions with respect to the belt or strip in which it is inserted.

Figure 12:
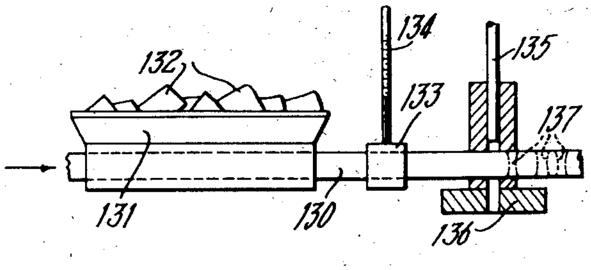
Fig. 12 shows the essential procedure for punching holes into the pin belt for yieldably holding the movable pins.
Figure 13:
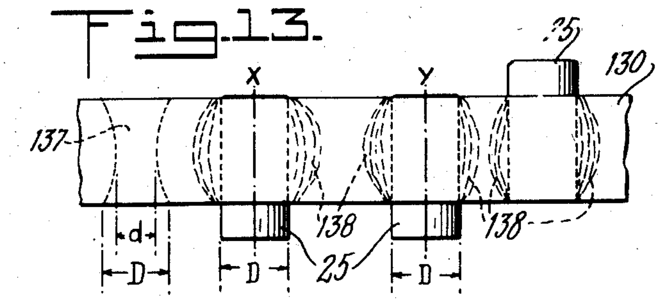
Fig. 13 illustrates further details of the process by which the pin belt is prepared and the positions taken by a pin in the pin belt when a pin is set to be sensed or restored to its neutral position.

Fig. 12 shows a method by which a pin belt can be prepared. A strip of material 130, such as polyvinyl butyral plastic, is advanced through a refrigerating pan 131 containing Dry Ice 132 past a temperature indicating station 133 having a thermometer 134 (to indicate the critical temperature necessary to produce the desired degree of the effect previously described), thence to a punch 135 and die 136 to produce the hour-glass shaped holes 137. Consequently, as explained, and referring to Fig. 13, a hole 137 of hour-glass shape is produced by a punch of diameter D. The resultant hole is approximately of diameter D where the punch enters and leaves the surfaces of the strip of material; however, approximately at its center the hole has a smaller diameter *d* tapering toward both ends to the larger diameter D. A pin 25 of diameter D inserted into the hole will cause the material of the strip to be compressed around the pin (as indicated in the areas 138) to yieldably retain the pin 25 in one of several positions of the pin's protruding as at X and Y.

A section of a pin belt 26, prepared in the manner described above, is shown in Fig. 11, together with a means whereby the protruding pins 25 can be restored to their normal positions. Pins shown protruding from the top of the belt 26 on the left side of the rollers 139 and 140 are passed between those rollers and pressed back into their normal positions as shown to the right of the rollers. As previously described, grooves may be cut in roller 140 to permit the pins 25 to be positioned normally so they protrude from the bottom of the belt 26 when they are not set.

The belt 26, a belt constructed as described above, is fed over the sprocket wheel 126 of which the teeth 128 engage the pin belt perforations 88, the belt 26 being held in contact with the sprocket wheel 126 by two pairs of rollers 141. Thence the belt 26 is fed around sprocket wheel 124 of which the teeth 127 engage the pin belt perforations 85, the belt being held in contact with sprocket wheel 124 by a pair of rollers 142. From sprocket wheel 124 the belt is fed through the reading area Z—Z' (see Fig. 6) where it is guided by a slotted member 143 and supported by the plates 144 which are secured to bent-over portions of the side plates 98 (see Fig. 4) to form a slotted platform upon which the belt 26 is supported in order to be sensed by the fingers of the Braille reader, the slotted portion of the platform permitting the protruding pins 25 to pass uninterrupted. The belt 26 is then fed over sprocket wheel 125 of which teeth 127 engage pin belt perforations 85, the belt 26 being held against the sprocket wheel 125 by a roller 145 mounted on a shaft 146 supported by a pair of arms 147 which are pivotally mounted on the studs 148. The arms 147 are connected to tension springs 149 which are fastened to studs 150 in the side plates 98 so that the roller 145 exerts sufficient pressure against the sprocket wheel 125 to reset the pins 25 in the pin belt 26 as the belt passes between these rollers in a manner similar to that shown in Fig. 11 with reference to rollers 139 and 140. The pin belt 26 is then fed to sprocket wheel 126, thereby completing its route of travel.

The sprocket wheel 126, rigidly secured to shaft 117, moves intermittently in the manner previously described, and is positioned on its shaft so that during the first idle period (54 to 174 degrees of rotation of shaft 44), each of three pins 25 in the first column of a group 27 in the pin belt 26 lies under its respective armature end 94*a*. During this time the magnets 86 are energized (at 100 degrees of rotation of shaft 44, which is a measure of the machine cycle) according to the closing of contacts on spring blades 66 and 67 resulting from pins 61 penetrating perforations in the record tape 20 at sensing station 23. After the magnets 86 are deenergized (at 160 degrees of machine cycle), the pin belt 26 is advanced rapidly (from 174 to 198 degrees) until the second idle period (from 198 to 318 degrees) of sprocket wheel 126 is reached when each of three pins 25 in the second column of a group 27 in the pin belt 26 lies under its respective armature end 94*a*. During this time, the magnets 86 again are energized (at 242 degrees) according to the closing of contacts on spring blades 66 and 67 resulting from pins 61 penetrating perforations in the record tape 20 at the sensing station 23.

The record tape 20 is held idle, the pins 61 penetrating perforations in the tape, during the entire period mentioned immediately preceding (i. e., from 54 degrees to 318 degrees of rotation of shaft 44). By means of the three cams 87 and their cooperating sets of contacts on the blades 89, 90, and 91 any or all of six perforations in the tape 20 can be sensed by the pins 61 to energize the magnets 86 through the contacts on the spring blades 66 and 67 so that the first three perforations in a line of six in the tape 20 may cause three pins 25 comprising the first column of a group 27 in the pin belt 26 to be set at one time and the second three perforations of the line of six in the tape 20 and three pins 25 comprising the second column of a group 27 in the pin belt 26 to be set at another time.

During the rotation of the shaft 44 from 318 degrees to 360 degrees (zero), the pin belt 26 only is advanced until at 30 degrees both the pin belt 26 and the record tape 20 are advanced so that a new group of pins on the former is presented to the pin setting mechanism and a new line of perforations on the latter is presented to the sensing station as the shaft 44 rotates in a position of 54 degrees. Pins 25 set up in the pin belt are so maintained until they travel past the roller 145 where they are reset or restored to normal.

The electrical circuits of the invention can be understood by reference to Fig. 3. Direct current for energizing magnets 86, all relays, and the clutch magnet 32 is obtained from a half wave rectifier 151 which charges a condenser 152 preloaded by a resistor 153 fed from the 115-volt 60-cycle supply represented by conductors 154 and 155. As previously mentioned, the driving motor 29 is regulated for speed by the rheostat 31 and the initial circuits are completed by closing contacts 156 and 157 of the switch 30.

When switch 30 is closed, a circuit is completed from line conductor 154 through switch 30, contacts 156, through relay coil 158, through half wave rectifier 151 to line conductor 155, thereby energizing the relay 158 and causing its normally open contacts 159 and 160 to become closed. The closing of contacts 159 causes current to flow from line conductor 154 through rheostat 31, through driving motor 29 to line conductor 155, thereby causing the motor 29 to operate.

A circuit is also established by closing of switch 30 from line conductor 154 through switch 30, contacts 157, relay coil 161 and clutch magnet 32 (in parallel), rectifier 151, line conductor 155 to energize clutch magnet 32 and relay 161, thereby closing its contacts 162 and 163. Clutch magnet 32 causes clutch 36 to couple the shafts 35 and 37 together.

A circuit control cam 164 is attached to shaft 41 in such a way as to close contacts 165 from 280 to 115 degrees (through 360 degrees) of the machine cycle.

When switch 30 is opened at any time between zero and 280 degrees of the machine cycle, operation will continue until 354 degrees, after which the inertia of the moving parts will cause operation to continue further up to 360 degrees when clutch 36 will decouple shafts 35 and 37 unless clutch magnet 32 is energized. The controlling circuits are as follows:

(1) Driving motor will remain energized by way of closed contacts 159 since relay 158 remains energized by the circuit—line conductor 154, contacts 162, contacts 160, relay coil 158, rectifier 151, line conductor 155.

(2) Clutch magnet 32 and relay 161 will remain energized by the circuit—line conductor 154, contacts 163, contacts 165, clutch magnet 32 and relay coil 161 (in parallel), rectifier 151, line conductor 155.

(3) At 115 degrees of the machine cycle, cam 164 opens contacts 165 deenergizing clutch magnet 32 and relay coil 161; contacts 162 and 163 will open. Clutch 36 will be conditioned to decouple shafts 35 and 37 when clutch magnet 32 releases. (Note: When switch 30 is opened after 115 degrees up to 279 degrees, contacts 157 will produce same result as contacts 165.)

(4) At 115 degrees when contacts 162 open, the current through relay coil 158 will be maintained by the circuit—line conductor 154, contacts 79 (closed from 68 to 354 degrees of machine cycle), contacts 160, relay coil 158, rectifier 151, line conductor 155.

(5) When contacts 79 open, the relay 158 is deenergized and contacts 159 and 160 will open, thereby deenergizing the driving motor 29.

When switch 30 is opened at any time after 280 degrees of the machine cycle, the machine will continue to operate until 354 degrees of the subsequent machine cycle and thereafter coast to a stop at 360 degrees, the clutch decoupling the drive shafts 35 and 37, as previously mentioned, since operating circuits will be maintained by the contacts 165 which close at 280 degrees to keep the relay coil 161 energized, even though the contacts 157 of switch 30 are open.

During the time the machine is running and when there is a record tape 20 properly positioned in the sensing unit, the magnets 86 will be energized in accordance with perforations in the record tape by the circuit—line conductor 155, rectifier 151, contacts 77 (closed by action of record tape against pin 76), contacts of spring blades 67 and 66, through contacts on blades 89 and 90 (for setting pins of the first column of a group 27 in a pin belt 26) or through contacts on blades 89 and 91 (for setting pins of the second column of a group 27 in a pin belt 26), magnets 86, contacts 160, contacts 162, line conductor 154.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefor, to be limited only as indicated by the scope of the following claims.

What is claimed is:

1. In a device of the class described, in combination, an endless flexible medium carrying a plurality of positionable pins adaptable to being set in combinations, a pin setting mechanism associated with said medium, a platform on which a portion of said medium is supported to permit physical inspection of said pins, a mechanism for restoring said pins to their original positions after being set, means for advancing said medium to present said pins successively to the said setting mechanism, to the said platform, and to the said restoring mechanism, and means coacting with the said setting mechanism to control the settings of the said pins.

2. The combination of a pin setting mechanism and a record sensing mechanism, means for advancing a record past said sensing mechanism, means for actuating the said setting mechanism in response to information sensed by the said sensing mechanism, an endless flexible medium carrying groups of movable pins adapted to be set in combinations, a pin restoring mechanism, means for advancing the said medium to present the said pins to the said setting medium and thereafter to the said restoring mechanism, and a platform between the said setting mechanism and the said restoring mechanism whereon the said medium is supported for physical inspection.

3. The invention set forth in claim 2 with the further inclusion of means for regulating the rate of advance of the said record and of the said medium.

4. The invention as set forth in claim 2 with the provision that the said medium is homogeneous.

5. The invention as set forth in claim 2 with the provision that the said medium consists of a pliable belt carrying a plurality of movable pins adapted to be set in combinations, said pins yieldably retained in holes in the said belt.

6. The invention as set forth in claim 2 with the provision that the said medium consists of an endless pliable belt having a plurality of holes, the diameter of each hole varying uniformly with its depth from a minimum diameter at its center of depth to a maximum diameter at each end, and a plurality of movable pins of a diameter substantially larger than the minimum hole diameter inserted in the said holes, the said pins being adapted to be set in combinations.

7. A flexible homogeneous medium containing a plurality of holes the diameter of each of which varies from a maximum at the ends of the hole to a minimum near the center of the hole, and a pin of a diameter substantially equal to the maximum diameter of the said hole inserted in each of the said holes, each of the said pins being positionable in its hole to protrude from either surface of the said medium upon the application of pressure to the end of said pin.

8. A flexible homogeneous medium containing a plurality of holes, and a plurality of movable pins inserted into the said holes, the said pins being adapted to be set in combinations and the said holes having a non-uniform bore so shaped to yieldably retain the said pins.

9. The invention as set forth in claim 8 with the provision that the said medium is a plastic.

10. A flexible medium preformed with a plurality of holes insertably to receive movable pins, the walls of the said holes being contoured for yieldably retaining said pins.

11. A flexible medium preformed with a plurality of holes insertably to receive movable pins, the said holes having a non-uniform bore so shaped to yieldably retain the said pins.

JAMES W. BRYCE.
JOHN N. WHEELER.

REFERENCES CITED

The following references are of record in the file of this patent:

UNITED STATES PATENTS

| Number | Name | Date |
|---|---|---|
| 1,178,991 | Brown | Apr. 11, 1916 |
| 1,862,633 | Ramsay | June 14, 1932 |

FOREIGN PATENTS

| Number | Country | Date |
|---|---|---|
| 165,926 | Great Britain | June 27, 1921 |
| 844,075 | France | Apr. 11, 1939 |